Nov. 3, 1931.  T. A. HELGESON  1,829,859
ANTISIDE SKID LUG
Filed Feb. 24, 1930
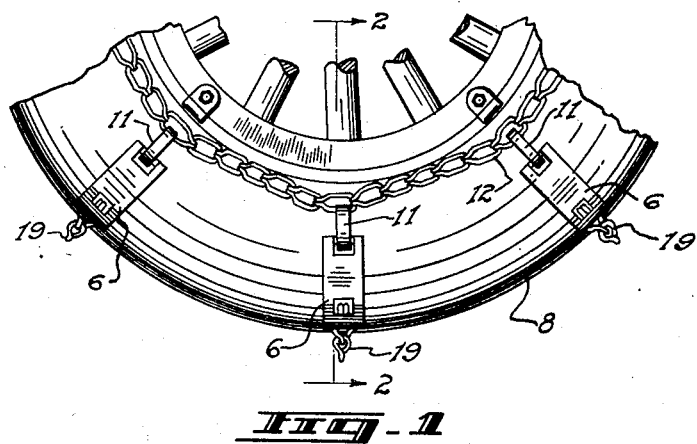
Fig. 1
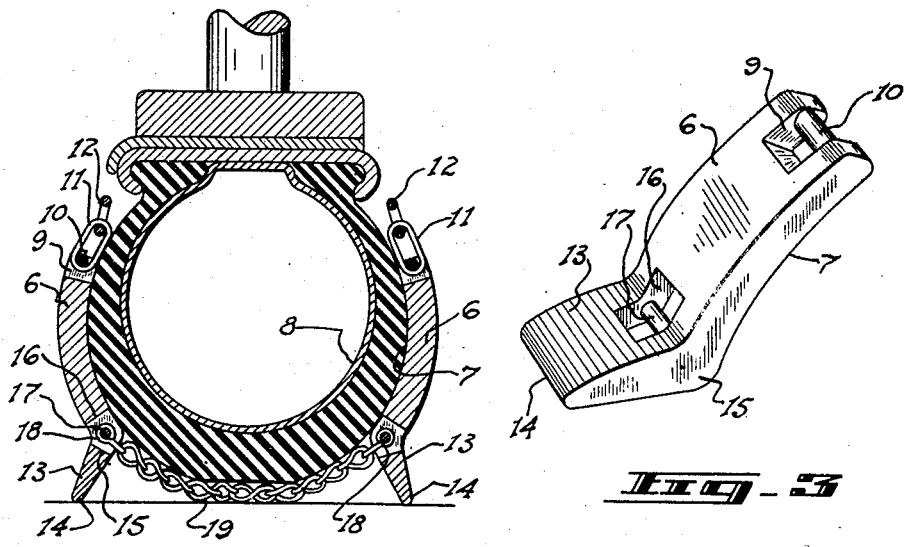
Fig. 2
Fig. 3
INVENTOR
Thomas A. Helgeson
his Attorney Patented Nov. 3, 1931

1,829,859

UNITED STATES PATENT OFFICE

THOMAS A. HELGESON, OF GYPSUMVILLE, MANITOBA, CANADA

ANTI-SIDE-SKID LUG

Application filed February 24, 1930, Serial No. 430,904, and in Canada March 1, 1929.

This present invention relates to certain new and useful improvements in an anti-side-skid lug for tires and has for its primary object the provision of a lug supported on the side of the tire and conforming to the outline thereof to automatically bite into the surface and grip the same or bind thereon when the wheel begins to skid to one side, thus preventing side skidding of the wheel without injuring the tire.

Another object of the invention resides in the provision of an anti-side-skid lug of the character stated which is of extremely simple and inexpensive construction, highly efficient in operation and may be readily mounted on a tire with the simplest form of side chains and cross chains with the improved lug arranged in pairs on opposite sides of the tire.

A further object of the invention resides in the provision of an anti-side-skid lug of the character stated having an out-turned bevelled end for automatic operation on the surface to prevent side skidding of the tire in either direction.

A still further object of the invention resides in the provision of an anti-side-skid lug of the character stated which is designed for arrangement in pairs on the opposite sides of the tire and conforming to the shape thereof so as to rest firmly against the tire and connect the ends of the tread chains used therewith to the side chains in such a manner as not to interfere with engagement of the said portion of the tire with the surface and normal movement of the wheel forwardly or rearwardly over the surface.

To the accomplishment of these and related objects as shall become apparent as the description proceeds, my invention resides in the construction, combination and arrangement of parts, as shall be hereinafter more fully described, illustrated in the accompanying drawings and pointed out in the claims hereunto appended.

The invention will be best understood and can be more clearly described, when reference is had to the drawings forming a part of this disclosure, wherein like characters indicate like parts throughout the several views.

In the drawings:—

Figure 1 is a fragmentary side elevation of a wheel with the improved anti-side-skid lug arranged thereon in pairs;

Figure 2 is an enlarged transverse section, taken substantially on the plane of line 2—2 of Figure 1, looking in the direction indicated by the arrows; and Figure 3 is an enlarged detail perspective of one of the lugs.

Referring more in detail to the drawings, it is to be noted that the anti-side-skid lug 6 has its main portion curved longitudinally so that its concave inner face 7 conforms to and rests against the side of the tire 8. The inner end of the lug 6 is bifurcated to provide the central opening 9 therein, in which a transverse pin 8 is mounted for engagement by a connecting link 11 which also connects with an opposite link of the side chain 12 extended around the inner edge of the tire 8. The outer surface engaging end 13 of the lug 6, is bevelled on its opposite flat faces and terminates in a sharp free edge 14. This end 13 of the lug 6 is turned outwardly at an angle to the main portion of the lug 6 and within the connecting or turned portion 15 of the lug 6, a pocket 16 is provided with a pin 17 mounted transversely therein for engagement by a hook 18 or the like carried on one end of the short transverse anti-skid chain 19 extending across the tread portion of the tire 8. The lug 6 is mounted in the same manner on both sides of the tire 8 and a sufficient number of the lugs 6 are employed to provide an arrangement of the same in pairs located a short distance apart around the complete tire 8. The lugs 6 are of such size in comparison to the tire 8 as to engage the greater portion of the sides thereof where the lugs 6 are located with the outer ends 13 of the lugs 6 extended a sufficient distance to locate them for immediate and effective engagement with the surface whenever the wheel should slip to either side and thus prevent side-skidding of the wheel. Under normal conditions, however, the ends 13 of the lugs 6 will not press upon the surface and therefore will not interfere with rotation of the wheel and proper movement of the vehicle over the surface, either forwardly or rearwardly. The transverse chains 19 extending across the tread portion of the tire 8 are free to function in the usual manner but are primarily employed in connection with the anti-side-skid lugs 6 to connect the lugs of each pair and thus co-operate with the side chains 12 to firmly hold the lugs 6 in proper position on the opposite sides of the tire 8.

As the construction of the device has thus been described in detail, brief reference is now had to its use and modus operandi: The lugs 6 are arranged in proper spaced relation radially on the opposite sides of the tire 8 and in pairs with the lugs 6 of each pair connected at their turned portions 15 by the transverse tread chains 19, the inner ends of the lugs 6 being connected with the side chains 12 by appropriate links 11. It is therefore apparent that the lugs 6 will be firmly held in pairs and retained in proper position on the sides of the tire 8 with the surface engaging end 13 of the lug 6 normally out of contact with the surface over which the wheel is travelling. Any movement of the wheel to either side as when there is a tendency for the wheel to skid to one side, the sharp edges 14 of the free outer ends 13 of the lug 6 on that side of the wheel will be brought into contact with the surface and grip the same whether an ordinary surface, a slippery or icy surface or a muddy and soft surface and thus immediately prevent side skidding of the wheel. As soon as the side skidding has been prevented and the tire 8 again assumes normal position on the wheel, the lugs 6 will be raised automatically from engagement with the surface and thus permit the wheel to continue proper movement over the surface, either forwardly or rearwardly with the tire 8 having its tread portion contacting normally with the surface and working thereon.

From the foregoing description taken in connection with the accompanying drawings, it will be manifest that an anti-side-skid lug is provided that will fulfil all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawings shall be interpreted as illustrative and not in a limited sense.

Having thus described my invention, what I claim as new and desire to secure by Letters Patent is:

1. An anti-side-skid lug for a tire including an elongated longitudinally curved body and a bevelled surface engaging end turned at an angle to the main portion of the body; transverse pins being supported in the turned portion of the lug and the inner end thereof.

2. An anti-side-skid lug for a tire including a longitudinally curved body having a bifurcated end and a bevelled surface engaging end turned at an angle to the main portion of the body with a pocket provided in the turned portion of said lug; and transverse pins supported in the bifurcated end and in the turned portion of said lug.

In testimony whereof I hereunto affix my signature.

THOMAS ALFRED HELGESON. [L. S.]